US009081577B2

(12) United States Patent
Conrad et al.

(10) Patent No.: US 9,081,577 B2
(45) Date of Patent: Jul. 14, 2015

(54) INDEPENDENT CONTROL OF PROCESSOR CORE RETENTION STATES

(71) Applicant: Intel Corporation, Santa Clara, CA (US)

(72) Inventors: Shuan M. Conrad, Cornelius, OR (US); Stephen H. Gunther, Beaverton, OR (US); Jeremy J. Shrall, Portland, OR (US); Anant S. Deval, Hillsboro, OR (US); Sanjeev S. Jahagirdar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 13/729,833

(22) Filed: Dec. 28, 2012

(65) Prior Publication Data
US 2014/0189225 A1 Jul. 3, 2014

(51) Int. Cl.
G06F 1/32 (2006.01)

(52) U.S. Cl.
CPC ............ G06F 1/3296 (2013.01); G06F 1/3243 (2013.01)

(58) Field of Classification Search
USPC .................................................. 713/300, 320
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |

(Continued)

FOREIGN PATENT DOCUMENTS

EP    1 282 030 A1    5/2003

OTHER PUBLICATIONS

U.S. Appl. No. 12/889,121, "Providing Per Core Voltage and Frequency Control," filed Sep. 23, 2010, by Pakaj Kumar.

(Continued)

Primary Examiner — Vincent Tran
(74) Attorney, Agent, or Firm — Trop, Pruner & Hu, P.C.

(57) ABSTRACT

In an embodiment, a processor includes a first processor core, a second processor core, a first voltage regulator to provide a first voltage to the first processor core with a first active value when the first processor core is active, and a second voltage regulator to provide a second voltage to the second processor core with a second active value when the second processor core is active. Responsive to a request to place the first processor core in a first low power state with an associated first low power voltage value, the first voltage regulator is to reduce the first voltage to a second low power voltage value that is less than the first low power voltage value, independent of the second voltage regulator. First data stored in a first register of the first processor core is retained at the second low power value. Other embodiments are described and claimed.

20 Claims, 10 Drawing Sheets

(56) References Cited

U.S. PATENT DOCUMENTS

| | | | |
|---|---|---|---|
| 7,260,731 B1* | 8/2007 | Read et al. | 713/320 |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,464,035 B2 | 6/2013 | Dixon | |
| 8,635,470 B1* | 1/2014 | Kraipak et al. | 713/300 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0025069 A1 | 2/2004 | Gary et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0070673 A1* | 3/2007 | Borkar et al. | 365/63 |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2008/0288799 A1* | 11/2008 | Branover et al. | 713/323 |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0077232 A1 | 3/2010 | Jahagirdar et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0054515 A1 | 3/2012 | Naffziger et al. | |
| 2012/0079290 A1* | 3/2012 | Kumar et al. | 713/300 |
| 2013/0305068 A1* | 11/2013 | Jung | 713/322 |
| 2014/0095896 A1* | 4/2014 | Carter et al. | 713/300 |
| 2014/0208141 A1* | 7/2014 | Bhandaru et al. | 713/322 |

OTHER PUBLICATIONS

SPEC-Power and Performance, Design Overview V1.1 0, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravin Ora Jejurikar, et al., "Leakage Aware Dynamic Voltage Scaling for Real-Time Embedded Systems," 2004, pp. 275-280.

Ravin Ora Jejurikar, et al., "Dynamic Slack Reclamation With Procrastination Scheduling in Real-Time Embedded Systems," 2005, pp. 13-17.

R. Tooling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 10 9-122.

Intel Developer Forum, IDF201 0, Opher Kahn, et al., "Intel Next Generation Microarchitecture Codename Sandy Bridge: New Processor Innovations," Sep. 13, 2010, 58 pages.

U.S. Appl. No. 13/247,580, filed Sep. 28, 2011, entitled "Controlling Temperature of Multiple Domains of a Multi-Domain Processor," by Avinash N. Ananthakrishan, et al.

U.S. Appl. No. 13/600,666, filed Aug. 31, 2012, entitled "Performing Cross-Domain Thermal Control in a Processor" by Xiuting C. Man, et al.

U.S. Appl. No. 13/729,908, filed Dec. 28, 2012, entitled "Apparatus and Method to Manage Energy Usage of a Processor" by Shaun M. Conrad, et al.

U.S. Appl. No. 13/727,052, filed Dec. 26, 2012, entitled "Interconnect to Communicate Information Uni-Directionally" by Shaun M. Conrad, et al.

International Searching Authority, "Notification of Transmittal of the International Search Report and the Written Opinion of the International Searching Authority," mailed Oct. 28, 2013, in International application No. PCT/US2013/048306.

* cited by examiner

INDEPENDENT CONTROL OF PROCESSOR CORE RETENTION STATES

BACKGROUND

Power and thermal management issues are considerations in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard, e.g., Rev. 3.0b, published Oct. 10, 2006, for optimizing the system in these areas. An ACPI implementation allows a processor core to be in different power-saving states (also termed low power or idle states), generally referred to as so-called C1 to Cn states.

When a core is active, it runs at a so-called C0 state, and when the core is idle, it may be placed in a core low power state, a so-called core non-zero C-state. The core C1 state represents the low power state that has the least power savings but can be entered and exited almost immediately, while an extended deep-low power state (e.g., C3) represents a power state where the static power consumption is negligible, but the time to enter/exit this state and respond to activity (i.e., back to C0) is longer.

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

In various embodiments, a processor having a multi-core architecture may provide for per core control of voltage. In this way, better control over power consumption and performance can be realized. For example, in a multi-core processor, one core may be configured to be in an idle state, e.g., C1. Voltage provided to each core of the multi-core processor may be independently adjusted, such that the core configured to be in the idle state is provided with a retention voltage that is less than a voltage associated with the C1 state, which can enable reduction in leakage power in the idle core while data stored in a register of the idle core is retained. In an embodiment, the retention voltage may be determined from information stored, e.g., in fuses or other non-volatile storage of the processor as written or fused during manufacture of the semiconductor die. The reduced voltage and consequent reduced power provided to the idle core can be redistributed to the active cores to enable some of the active cores to run at a higher frequency. Wasted power due to leakage in the idle core may be saved and may be shifted to the active cores with a resultant higher processing efficiency of the multi-core processor.

Figure 1:
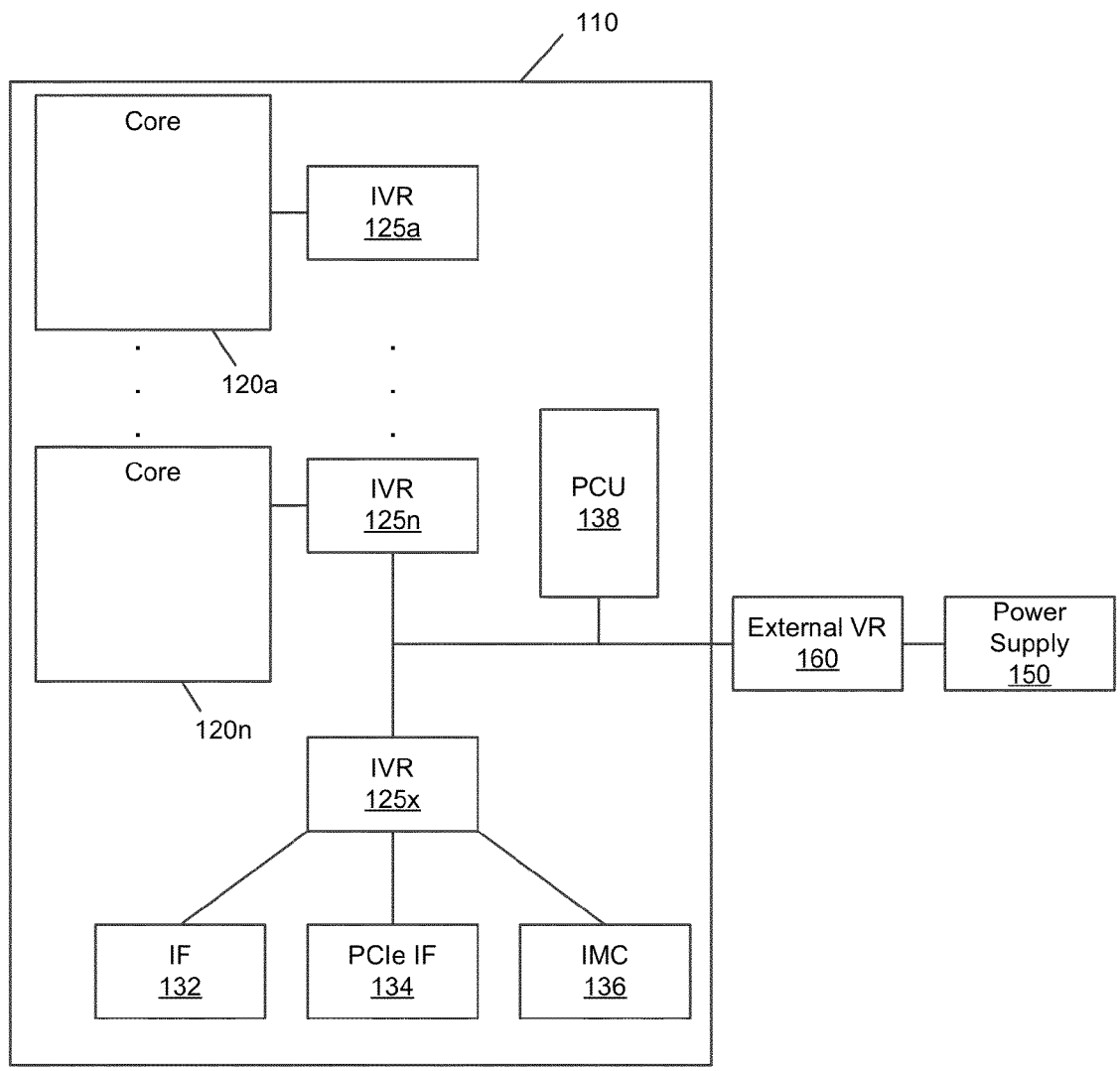
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores 120a-120n. In addition, each core may be associated with an individual voltage regulator 125a-125n to allow for fine-grained control of voltage and thus power and performance of each individual core. As such, each core can operate at an independent voltage and frequency, enabling great flexibility and affording wide opportunities for balancing power consumption with performance. While shown in the implementation of FIG. 1 with an integrated voltage regulator, embodiments are not so limited.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 15, 2007). While not shown for ease of illustration, understand that additional components may be present within processor 110 such as additional uncore logic and other components such as internal memories, e.g., one or more levels of a cache memory hierarchy and so forth.

Also shown is a power control unit (PCU) 138, which may include hardware, software and/or firmware to perform power management operations with regard to processor 110. PCU 138 may be coupled via a dedicated interface to external voltage regulator 160. In this way, PCU 138 can instruct the voltage regulator to provide a requested regulated voltage to the processor.

According to the Advanced Configuration and Platform Interface (ACPI) standard (e.g., Rev. 3.0b, published Oct. 10, 2006) a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor. In addition, according to ACPI, a processor can operate at various power states or levels. With regard to power states, ACPI specifies different power consumption states, generally referred to as C-states C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

In operation, an instruction may be received by the power control unit 138 from, e.g., an operating system or a software entity operating on the operating system, to place core 120a in an idle state having an idle state voltage, e.g., C1. Responsive to the instruction, a retention voltage may be provided to the core 120a by the IVR 125a that is less than the idle state voltage and stored data may be retained in one or more registers and/or other storages of the core 120a while the core 120a is maintained at the retention voltage. The retention voltage to the core 120a may be set independent of voltages provided to the other cores 120$_b$-120$_n$. Reduction of the voltage to the core 120$_a$ to a value that is less than the idle state voltage can save power that is otherwise wasted due to leakage within core 120$_a$. The saved power may be used by other cores of the multi-core processor, by e.g., increasing frequency of some of the cores. Thus, through independent adjustment of the voltage provided to each core, e.g., reduction to a data retention voltage that enables ongoing storage of data in registers or other storages of the core, power that might be wasted due to leakage can be used instead to increase overall efficiency of the multi-core processor.

In other embodiments, voltage to core 120a may be reduced to a retention voltage less than a reduced voltage associated with another reduced activity state such as the C3 state (in which typically all internal clock signals are stopped and the CPU does not answer requests or interruptions), or in another reduced activity state that differs from the active state. After the supplied voltage is reduced to the retention voltage, power saved (due to, e.g., reduction in leakage) due to reduction of supplied voltage to the retention voltage may be distributed to other cores of the multicore processor that can result in increased efficiency in operation of the multi-core processor. Alternatively, the power saved as a result of the further reduced voltage may result in a smaller net energy expenditure to operate the multicore processor than without implementation of the further voltage reduction after the C state is established in the core 120a.

Figure 2:
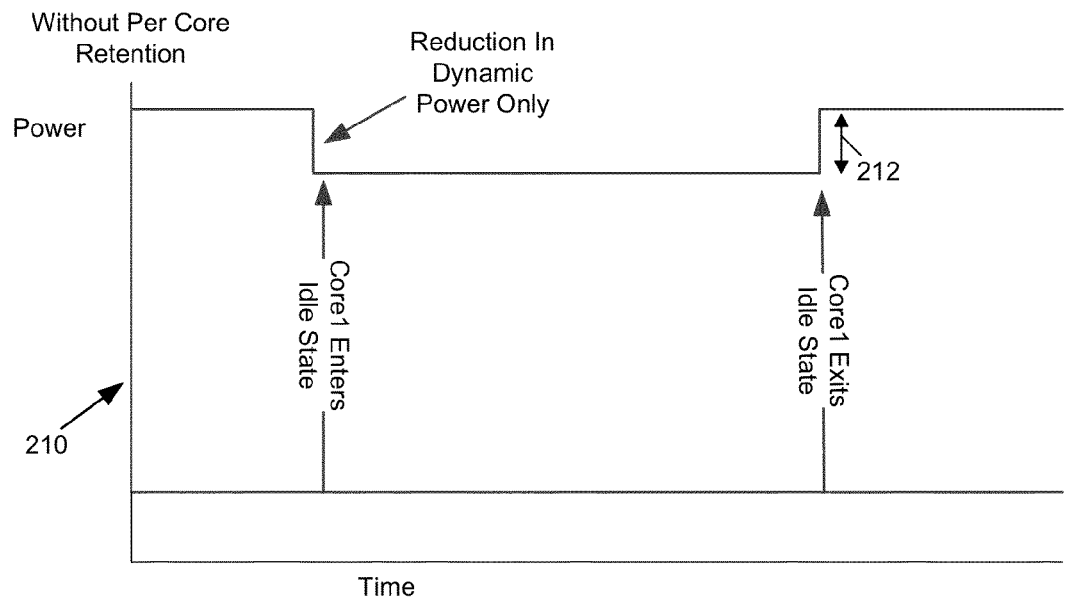
FIG. 2 depicts graphs representing power reduction according to an embodiment of the present invention.
Figure 2:
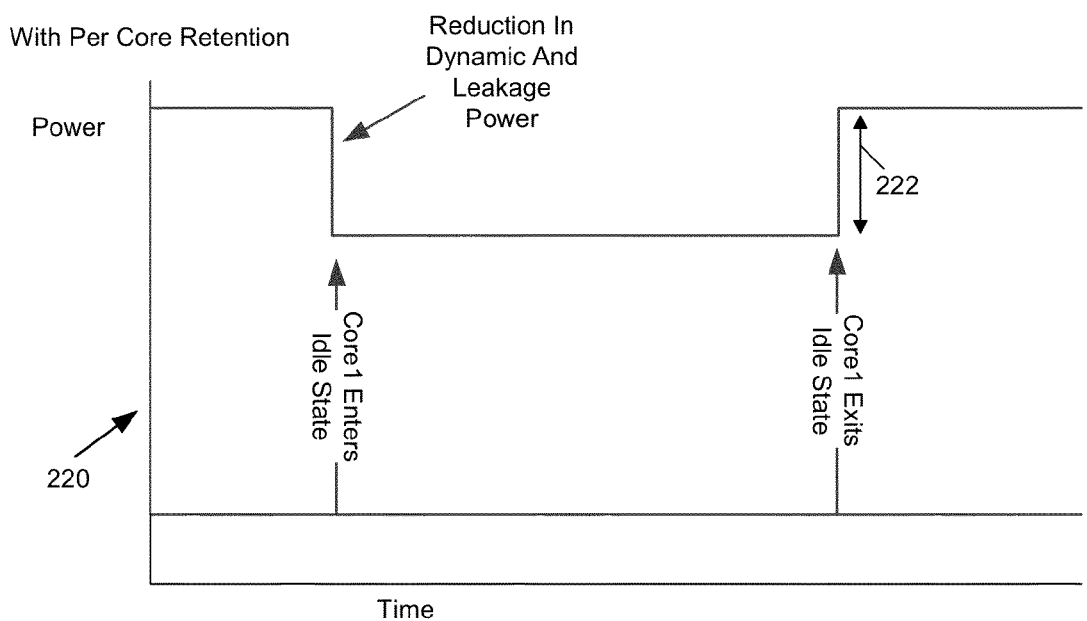

Referring now to FIG. 2, shown are graphs 200 of power consumption of a multi-core processor, according to an embodiment of the present invention. Graph 210 illustrates a reduction 212 in power consumption of a multi-core processor that results from placing core 1 of the multi-core processor in an idle state, e.g., C3 in which power is typically reduced by stopping all internal clock signals, while other cores remain active. The reduction in power consumed (dynamic power) by the multi-core processor is due to the idle state of core 1. Graph 220 illustrates a reduction 222 in power consumption due to a reduced voltage provided to the core 1 while core 1 is in the C3 state while core 1 retains data in one or more registers of core 1. Reduction of voltage to core 1 in the C3 state while data is retained in the registers of core 1 results in reduced overall power consumption of the multi-core processor, as compared with placing core 1 in the C3 state without further reducing the voltage supplied to core 1. Further, retention of the data in one or more of the registers of core 1 may result in a quicker return to the active state C0 when the core 1 is re-activated, which may be associated with a net energy savings as compared with a return to the C0 state (or to another state, e.g., C1) from the C3 state without retention of the data stored in one or more of the registers of core 1.

Figure 3:
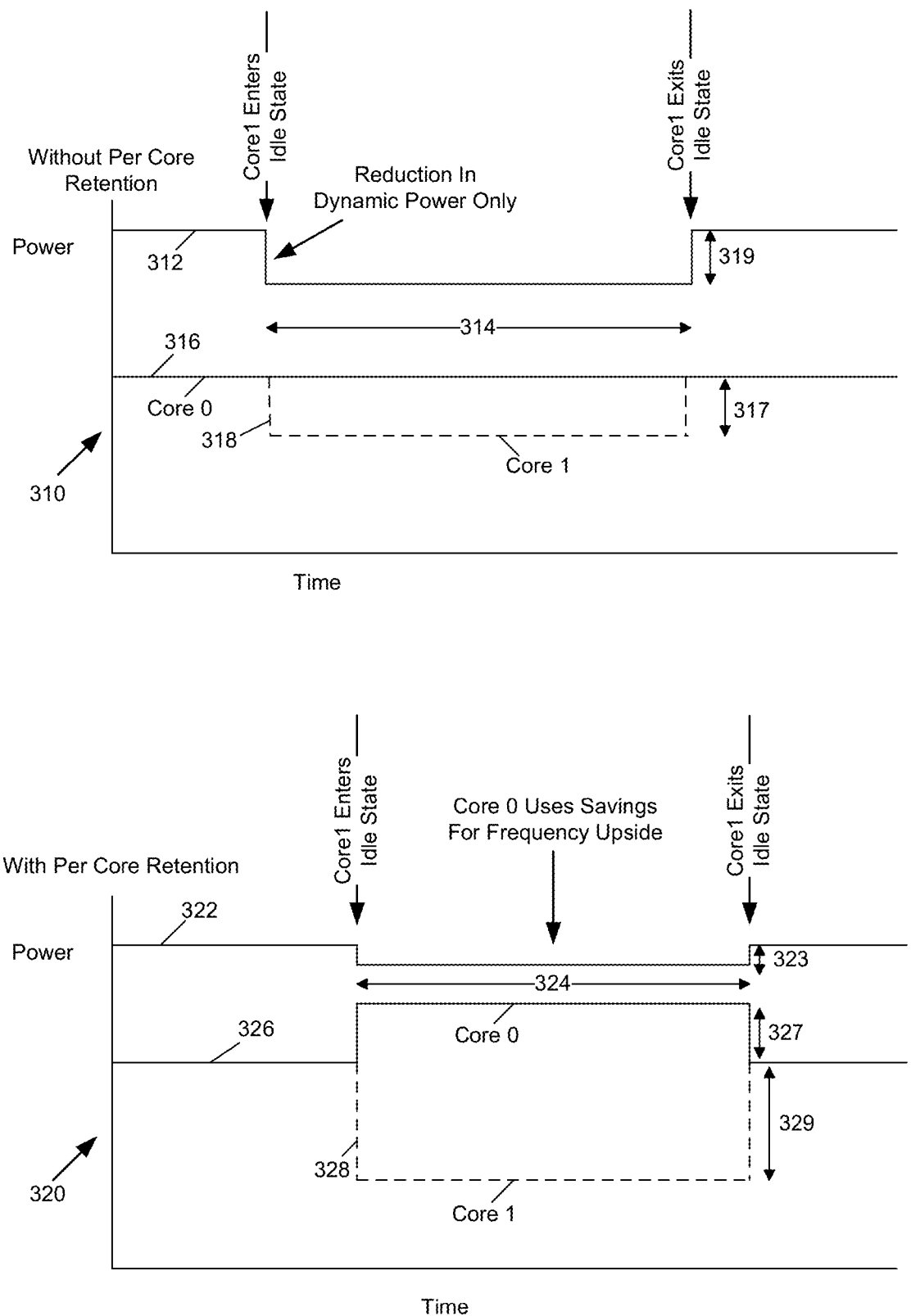
FIG. 3 depicts graphs representing power reduction according to another embodiment of the present invention.

Referring now to FIG. 3, shown are graphs of power consumption of individual cores of a multi-core processor, according to an embodiment of the present invention. Graph 310 illustrates power reduction of a multi-core processor that results from placing core 1 of the multi-core processor in an idle state, e.g., C3, while other cores remain active. Curve 312 is a representation of total power consumed by the multi-core processor over time. During a time period 314, the total power consumed by the multi-core processor drops by an amount 319 due to core 1 being placed in the C3 state. Curve 316 represents power consumed by core 0. During the time period 314, core 0 consumes the same amount of power as before and after time period 314. Curve 318 represents power consumed by core 1 over time. During the period 314, the power consumed by core 1 is reduced by an amount 317, approximately equal to the reduction 319 in total power consumed by the multi-core processor. The reduction 319 in power consumed by the multi-core processor is due to the idle state of core 1.

Graph 320 illustrates a further savings in power usage, and redistribution of the saved power, due to a reduction in voltage provided to core 1 to a retention voltage. The voltage supplied is to be reduced to the retention voltage (less than an idle state voltage, e.g., associated with the C3 state) that enables retention of data stored in one or more registers of core 1. Power saved by reduction of core 1 to the retention voltage can be utilized by core 0, e.g., to increase a frequency of core 0. As illustrated in curve 322, total power consumption of the multi-core processor is slightly reduced, e.g., by an amount 323 during time period 324, as compared with the total power consumption before and after the time period 324. Curve 328 illustrates a reduction 329 in power consumed by core 1 during the time period 324. The reduction 329 is greater than the reduction 317 due to a reduction of supplied voltage to core 1 to the retention voltage, which is less than the idle state voltage associated with the C3 state, while the stored data in core 1 is retained. Supply of the retention voltage to core 1 while the stored data in core 1 is retained allows for additional power 327 to be utilized by core 0, which additional power might otherwise be lost to leakage effects.

Figure 4:
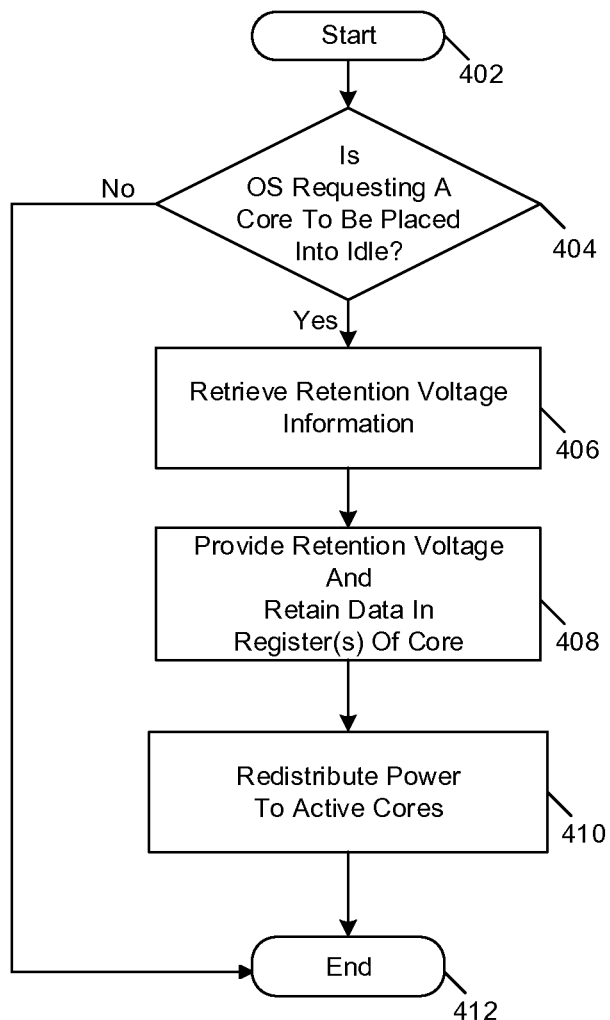
FIG. 4 is a flow diagram of a method in accordance with another embodiment of the present invention.
Figure 5:
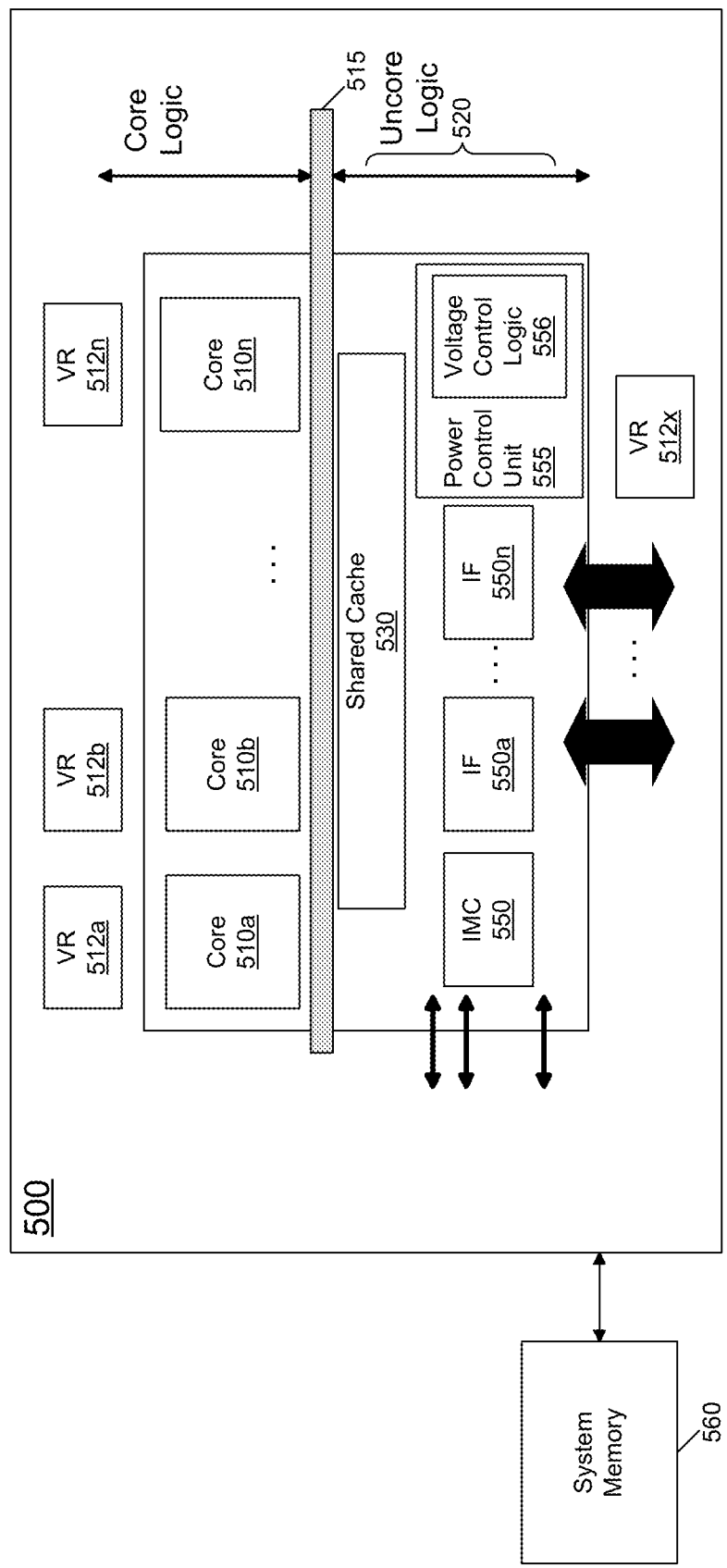
FIG. 5 is a block diagram of a processor in accordance with an embodiment of the present invention.

Referring now to FIG. 4, shown is a flow chart 400 that describes a method performed by voltage control logic (e.g., power control unit (PCU) 138 of FIG. 1, voltage control logic 556 of FIG. 5, or other such logic), according to an embodiment of the present invention. The method begins at 402. Proceeding to decision diamond 404, it is determined whether an operating system (or other software entity executing on or below the operating system) requests that a first core within a multi-core processor be placed into an idle state, e.g., C1 or C3. If the operating system does not request that the first core be placed into an idle state, the method ends at 412.

If the operating system requests that the first core be placed into the idle state, moving to 406, retention voltage information is retrieved from storage. The retention voltage information may be obtained from, e.g., a configuration storage accessible to the PCU, in an embodiment. Proceeding to block 408, a retention voltage, less than an idle state voltage associated with the requested idle state, is provided to the first core and data stored in one or more registers of the first core (and other storages of the core such as one or more levels of a cache memory hierarchy) is retained while the voltage is maintained at the retention voltage. Various operations may occur to enable the first core to be placed into a retention state. In an embodiment, these operations may include draining of pending transactions, saving of core state, and/or shutoff of one or more circuits of the first core, e.g., clock circuit, oscillator, etc. In an embodiment, the voltage change from an active state voltage to the retention state voltage may be effected via a command from the PCU to a voltage regulator (either internal or external to the processor) to cause the regulator to provide a lower voltage to the core. Note that this voltage reduction may occur independent of the operating system requested C-state change (and the voltage reduction may be invisible to the operating system).

Moving to block 410, optionally, available power due to the reduction in voltage to the first core is redistributed to one or more active cores of the multi-core processor. In an embodiment, the PCU may allocate a power budget value corresponding to the saved power from this idle core to one or more other cores to enable operation at an increased voltage and/or frequency. (Alternatively, the available power due to the reduction in voltage to the first core can be saved, e.g., the available power may not be utilized by other cores, but may instead result in a smaller overall energy expenditure as compared with no reduction of the voltage from the first value to the second value.) The method ends at 412. While shown with this particular implementation in FIG. 4, understand that the scope of the present invention is not limited in this regard.

Referring now to FIG. 5, shown is a block diagram of a processor in accordance with an embodiment of the present invention. As shown in FIG. 5, processor 500 may be a multicore processor including a plurality of cores $510_a$-$510_n$. In one embodiment, each such core may be configured to operate at multiple voltages and/or frequencies. In addition, each core may be independently controlled to operate at a selected voltage and/or frequency, as discussed above. To this end, each core may be associated with a corresponding voltage regulator 512a-512n. The various cores may be coupled via an interconnect 515 to an uncore 520 that includes various components. As seen, the uncore 520 may include a shared cache 530 which may be a last level cache. In addition, the uncore may include an integrated memory controller 540, various interfaces 550 and a power control unit 555.

In various embodiments, power control unit 555 may be in communication with OS power management code. For example, based on a request received from the OS and information regarding the workloads being processed by the cores, voltage control logic 556 within power control unit 555 may determine an appropriate voltage at which to operate each of the cores, such as described above with respect to FIGS. 1-4. For example, the voltage control logic 556 may generate a plurality of control signals to cause the voltage regulators to control the voltage provided to the corresponding cores, e.g., reduce voltage supplied to one of the cores to a retention voltage that is less than an idle state voltage of a requested idle state, which can result in reduced power loss due to leakage effects while stored data is retained in registers of the idled core. Additionally, power saved by reduction of leakage losses may be redistributed by increasing respective voltage to one or more of the other cores, which can increase overall efficiency of the processor.

With further reference to FIG. 5, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 5, the scope of the present invention is not limited in this regard.

Figure 6:
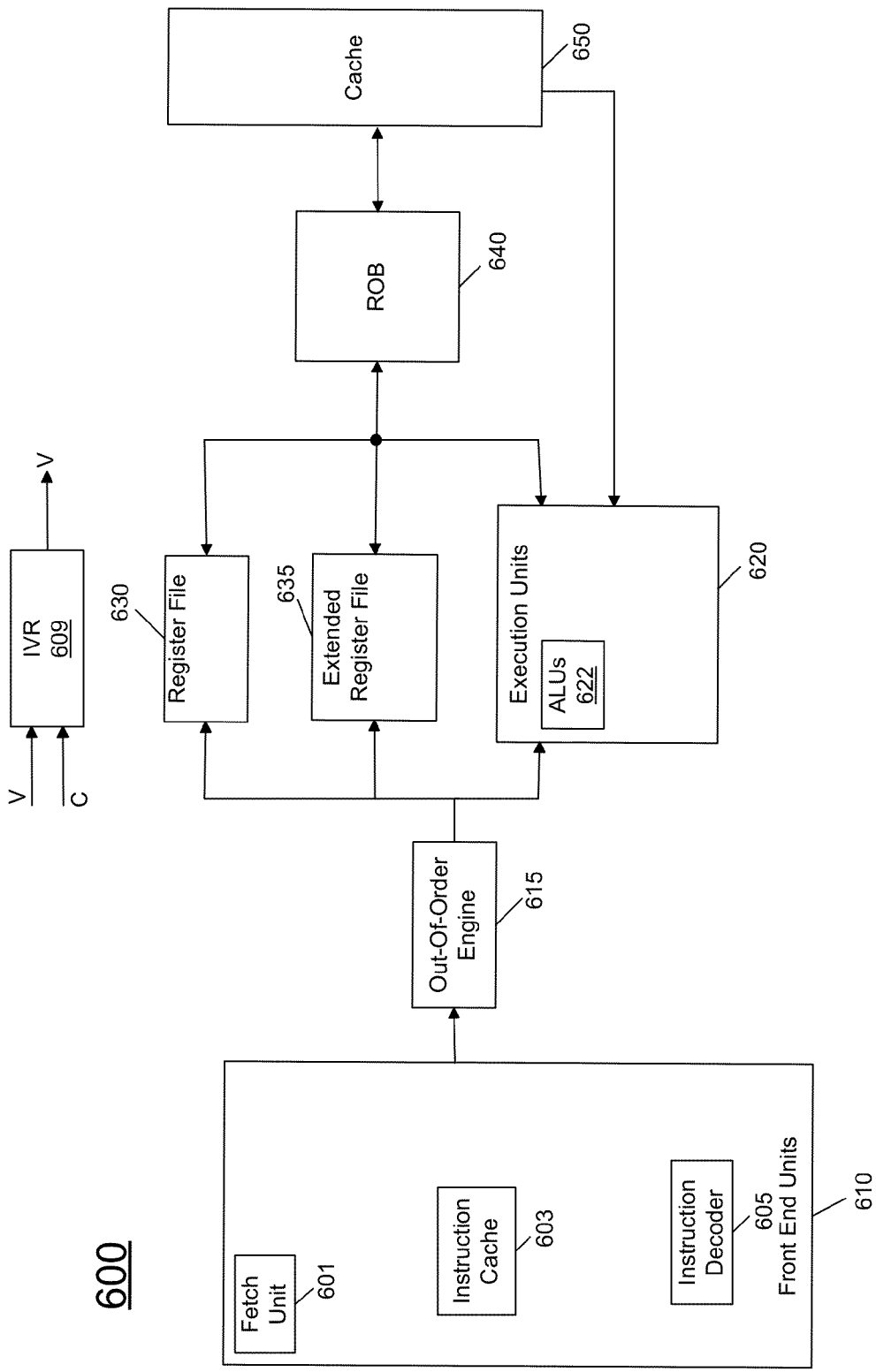
FIG. 6 is a block diagram of a processor core in accordance with an embodiment of the present invention.

Referring now to FIG. 6, shown is a block diagram of a processor core in accordance with one embodiment of the present invention. As shown in FIG. 6, processor core 600 may be a multi-stage pipelined out-of-order processor. As shown in FIG. 6, core 600 may operate at various voltages as a result of integrated voltage regulator 609. In various embodiments, this regulator may receive an incoming voltage signal, e.g., from an external voltage regulator. For example, in response to a received voltage signal to place core 600 into an idle state, e.g., C1 or C3, the integrated voltage regulator 609 may reduce supplied voltage to a retention voltage that is less than an idle state voltage associated with the requested idle state, so as to reduce power loss due to leakage effects while data is retained that is stored in one or more registers of the core 600, e.g., register file 630 and extended register file 635.

As seen in FIG. 6, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 6, ROB 640 is coupled to a cache 650 which, in one embodiment may be a low level cache (e.g., an L1 cache) although the scope of the present invention is not limited in this regard. Also, execution units 620 can be directly coupled to cache 650. From cache 650, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
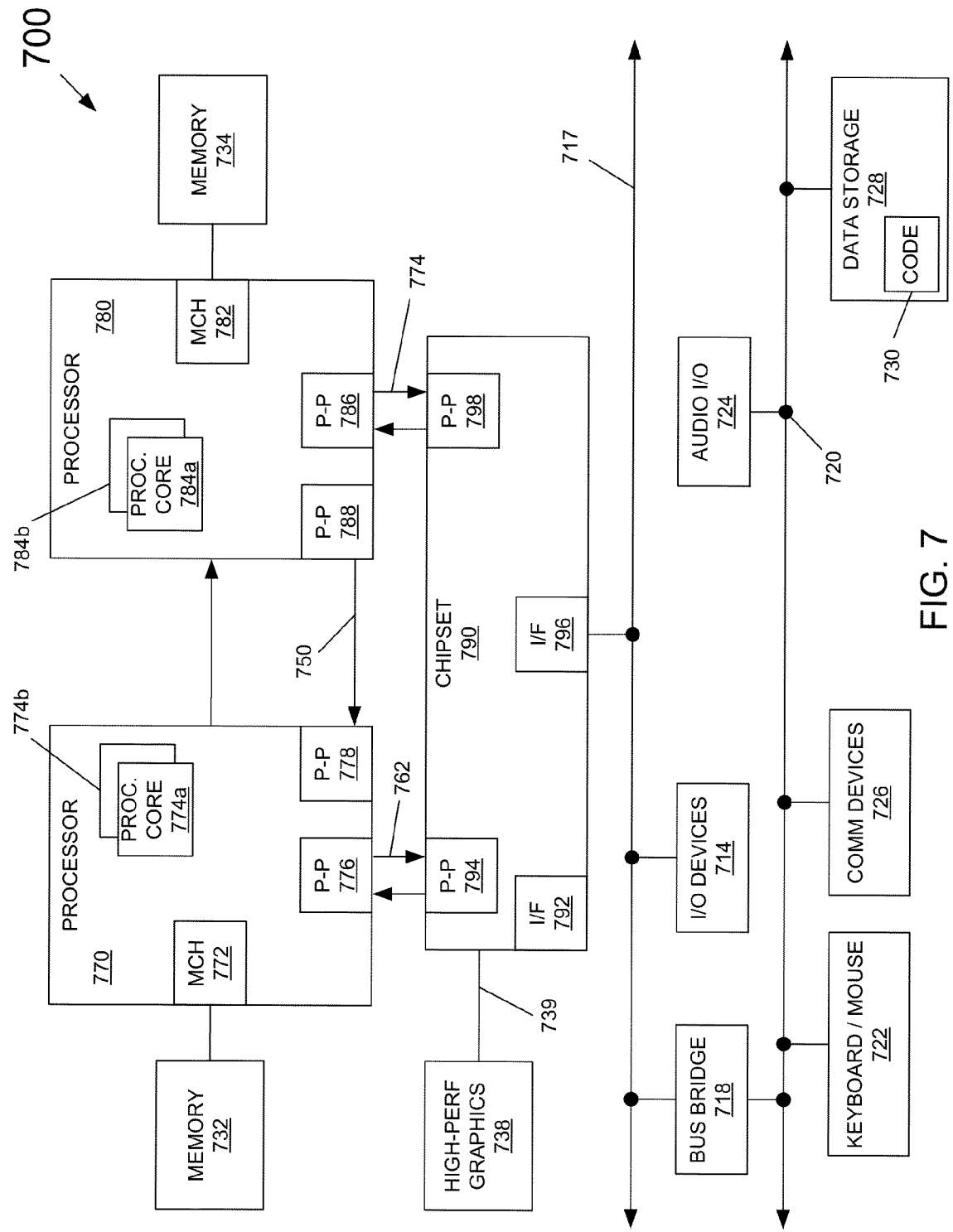
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774$a$ and 774$b$ and processor cores 784$a$ and 784$b$), although potentially many more cores may be present in the processors. Each of the cores may operate at independent voltages/frequencies using multiple independent voltage regulators present within the processors (not shown for ease of illustration in the embodiment of FIG. 7). For example, in response to a received control signal to place core 784$a$ into an idle power state, e.g. C1 or C3, an independent voltage regulator dedicated to regulating voltage to core 784$a$ may provide a retention voltage that is less than an idle state voltage associated with the requested idle power state, which may reduce power loss due to leakage effects while data stored in one or more registers of the core 784$a$. Note that this voltage reduction can occur independently of the voltage supplied to other cores, which may continue to be supplied with an operating voltage for a given active state. Power saved by reduction of leakage loss may be redistributed by adjusting respective voltage to one or more of the other cores of the multicore processor 780, which can increase overall efficiency of the processor 780. Alternatively, the power saved may result in a lower overall power consumption of the multicore processor 780.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In addition chipset 790 may include an interface 795, which may be a storage controller to interface with a storage 719. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, or so forth.

Figure 8:
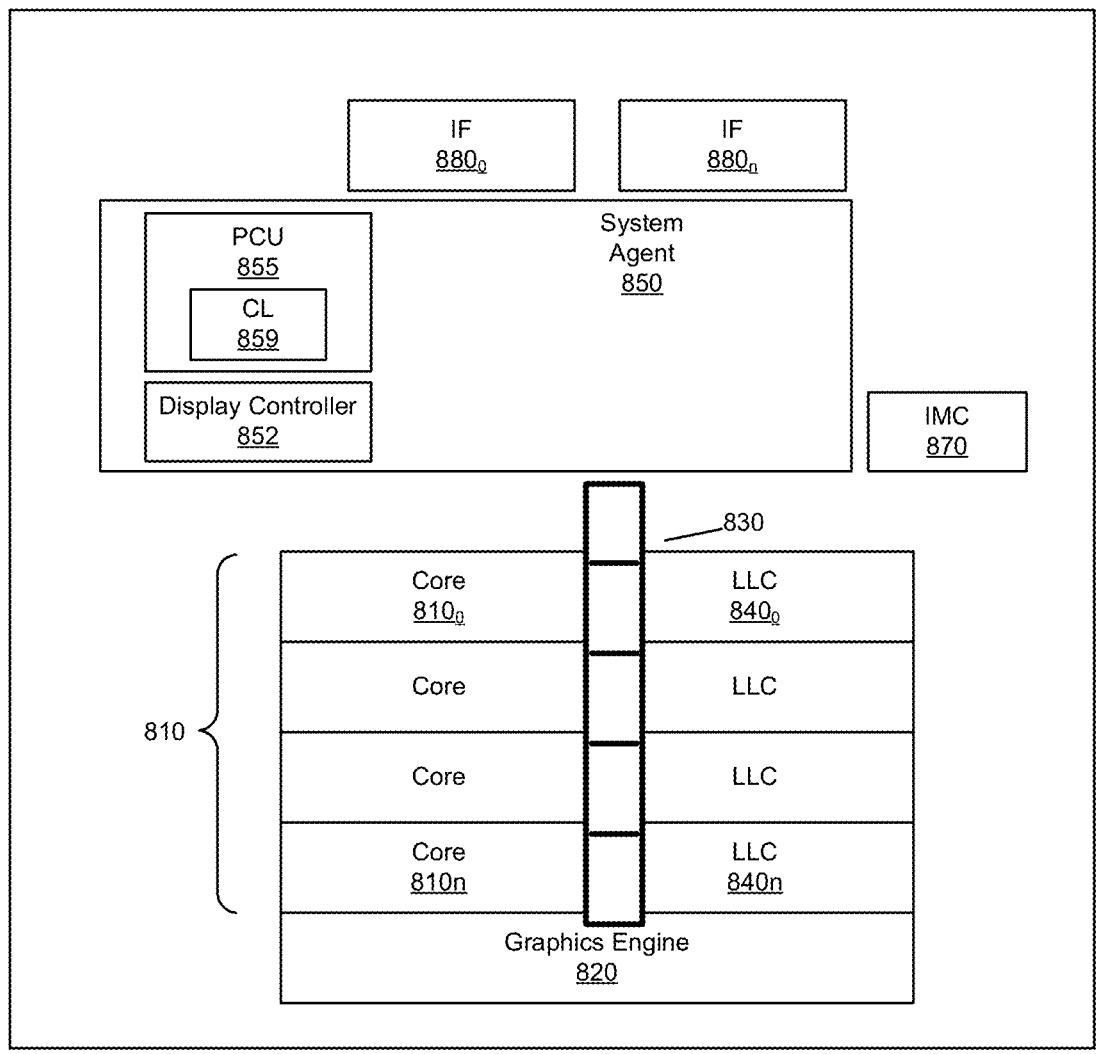
FIG. 8 is a block diagram of a multi-domain processor in accordance with another embodiment of the present invention.

Referring now to FIG. 8, shown is a block diagram of a multi-domain processor in accordance with another embodiment of the present invention. As shown in the embodiment of FIG. 8, processor 800 includes multiple domains. Specifically, a core domain 810 can include a plurality of cores $810_0$-$810_n$, a graphics domain 820 can include one or more graphics engines, and a system agent domain 850 may further be present.

As further seen, system agent domain 850 may include display controller 852 which may provide control of and an interface to an associated display. As further seen, system agent domain 850 may include a power control unit 855 which can include control logic 859 to control voltages provided to each core $840_0$-$840_n$. In some embodiments, system agent domain 850 may execute at an independent frequency than the cores $810_0$-$810_n$ of the core domain 810 and may remain powered on at all times to handle power control events and power management.

Each core $810_0$-$810_n$ may operate at a different voltage and a different frequency. For example, the core $810_0$ may be placed in a retention state while the other cores are active, e.g., C0 state. A retention state voltage supplied to core $810_0$ may be less than an idle state voltage associated with a request to place the core $810_0$ in an idle state, e.g., C3. Data may be retained in registers of the core $810_0$ while the supplied voltage is the retention state voltage, in accordance with embodiments of the present invention. Power saved by reduction of the voltage to core $810_0$ below the C3 voltage level can result in reduction of power loss due to leakage within core $810_0$ and the saved power may be redistributed to one or more of the cores $810_1$-$810_n$ in accordance with embodiments of the present invention. Alternatively, the saved power may reduce an overall power operating cost of the core domain 810 in accordance with embodiments of the present invention.

In general, each core $810_0$-$810_n$ may further include low level caches in addition to various execution units and additional processing elements. In turn, the various cores may be coupled to each other and to a shared cache memory formed of a plurality of units of a last level cache (LLC) $840_0$-$840_n$. In various embodiments, LLC 840 may be shared amongst the cores and the graphics engine, as well as various media processing circuitry. As seen, a ring interconnect 830 thus couples the cores together, and provides interconnection between the cores, graphics domain 820 and system agent circuitry 850. In one embodiment, interconnect 830 can be part of the core domain. However in other embodiments the ring interconnect can be its own domain.

As further seen in FIG. 8, processor 800 can further include an integrated memory controller (IMC) 870 that can provide for an interface to a system memory, such as a dynamic random access memory (DRAM). Multiple interfaces $880_0$-$880_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Figure 9:
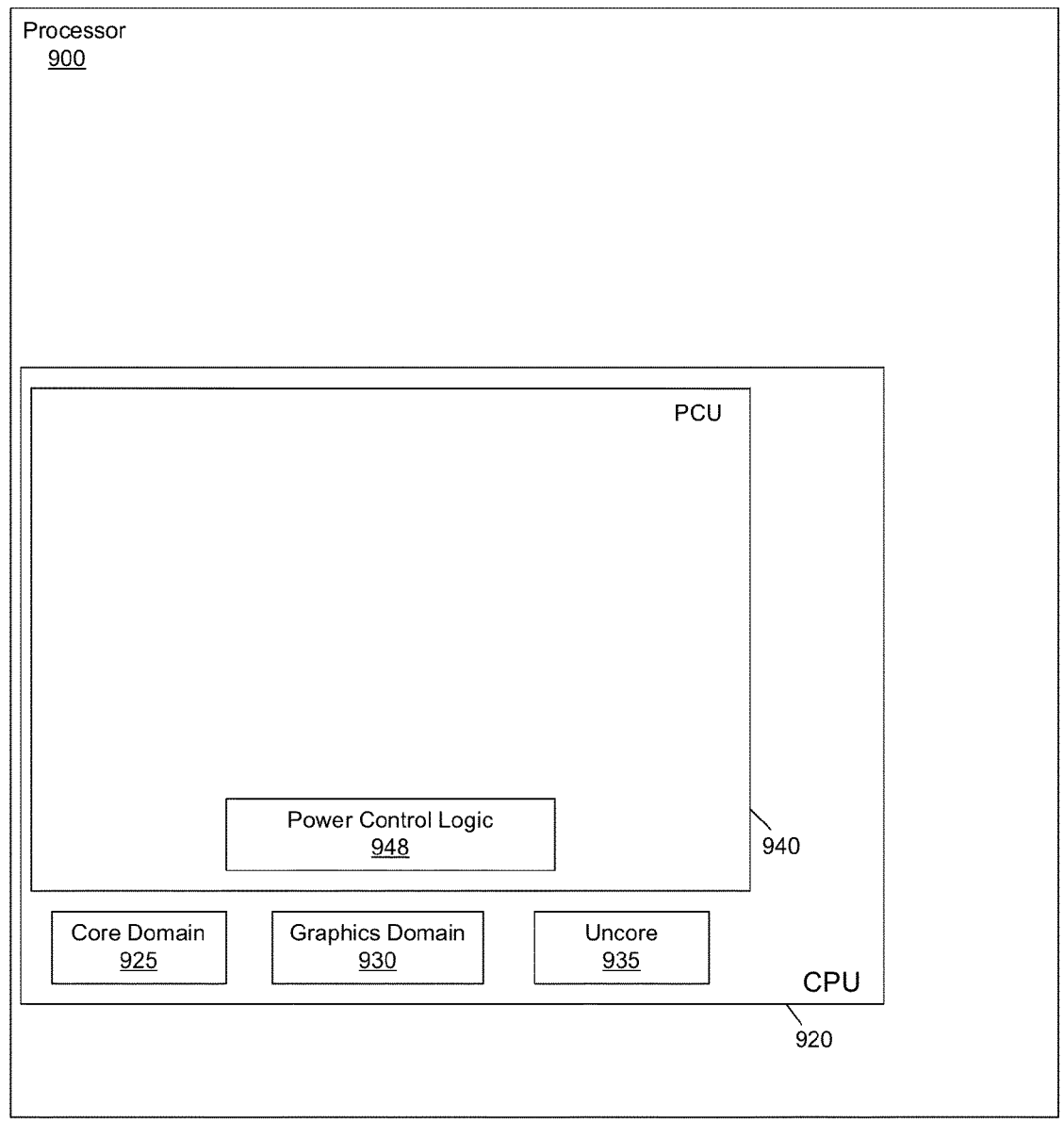
FIG. 9 is a block diagram of a processor in accordance with another embodiment of the present invention.

Referring now to FIG. 9, shown is a block diagram of a processor in accordance with another embodiment of the present invention. In FIG. 9, processor 900 may be a multi-core processor. A central processing unit (CPU) 920 may include multiple domains including a core domain 925 which may include a plurality of processor cores $925_0$-$925_n$ (not shown), a graphics domain 930 which may include one or more graphics processing units (GPU) such as one or more graphics cores, and an uncore domain 935 which may include other circuitry of the processor such as cache memories, a memory controller, other fixed function units, logic circuitry and so forth. As further seen, CPU 920 further includes a power control unit (PCU) 940 which in the embodiment shown may be configured with various circuitry, logic and so forth to perform power management operations for the processor. Note that the view shown in FIG. 9 is at a high level to show the features relevant to power control in accordance with an embodiment of the present invention and is not intended to show the full processor circuitry. In addition, the location of some circuitry is shown logically rather than physically, in that in some embodiments PCU 940 may be physically part of uncore domain 935.

The PCU 940 may include power control logic 948 that may reduce voltage supplied to the processor core $925_0$ to a retention voltage that is less than an idle state voltage associated with an idle state, e.g., C3, while maintaining at least one of the other processor cores in an active state, e.g., C0. By supplying the processor core $925_0$ with the retention voltage, stored data is retained in the processor core $925_0$, in accordance with an embodiment of the present invention. Power saved by reduction of the processor voltage of processor core $925_0$ to the retention voltage that is less than the idle state voltage associated with the C3 state may result in power saved due to reduced power loss as a result of, e.g., leakage effects. The saved power may be redistributed to one or more of the other processor cores in accordance with embodiments of the present invention. Alternatively, the saved power may result in reduced energy cost of operation of the processor. While shown at this high level in the embodiment of FIG. 9, understand the scope of the present invention is not limited in this regard.

Figure 10:
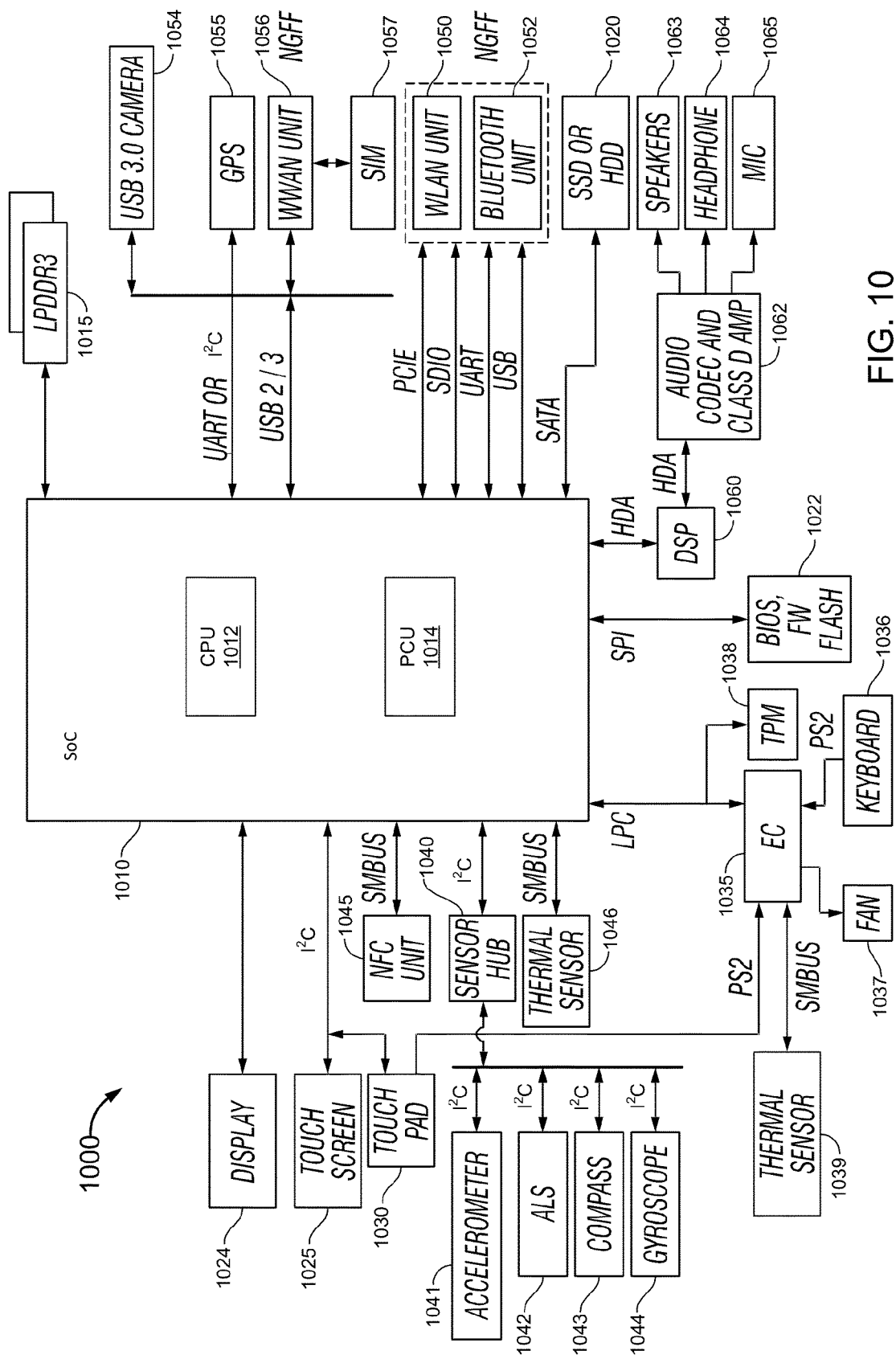
FIG. 10 is a block diagram of components present in a computer system in accordance with an embodiment of the present invention.

Referring now to FIG. 10, shown is a block diagram of components present in a computer system in accordance with an embodiment of the present invention. As shown in FIG. 10, system 1000 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 10 is intended to show a high level view of many components of the computer system. However, it is to be understood that additional components may be present in certain implementations and furthermore, different arrangement of the components shown may occur in other implementations.

As seen in FIG. 10, a processor 1010, which may be a low power multicore processor socket such as an ultra-low voltage processor, may act as a main processing unit and central hub for communication with the various components of the system. Such processor can be implemented as a system on a chip (SoC) as described herein. In one embodiment, processor 1010 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 1010 may include central processing unit (CPU) 1012 that includes a plurality of processor cores $1025_0$-$1025_n$ (not shown), and a power control unit (PCU) 1014. The PCU 1014 may place the processor core $1025_0$ into a data retention state having a retention voltage that is less than an idle state, e.g., C3, while maintaining at least one of the other processor cores $1025_1$-$1025_n$ in an active state, e.g., C0, in accordance with an embodiment of the present invention. In the data retention state the processor core $1025_0$ can retain data stored in its registers. Power saved by reduction of the processor voltage of processor core $1025_0$ to a reduced voltage below the processor voltage of the C3 state may result in power saved due to reduced power loss as a result of, e.g., leakage effects. The saved power may be redistributed to one or more of the other processor cores $1025_1$-$1025_n$ in accordance with embodiments of the present invention. Alternatively, the saved power may result in reduced energy cost of operation of the processor.

Processor 1010 may communicate with a system memory 1015, which in an embodiment can be implemented via multiple memory devices to provide for a given amount of system memory. To provide for persistent storage of information such as data, applications, one or more operating systems and so forth, a mass storage 1020 may also couple to processor 1010. Also shown in FIG. 10, a flash device 1022 may be coupled to processor 1010, e.g., via a serial peripheral interface (SPI). This flash device may provide for non-volatile storage of system software, including a basic input/output software (BIOS) as well as other firmware of the system.

Various input/output (IO) devices may be present within system 1000. Specifically shown in the embodiment of FIG. 10 is a display 1024 which may be a high definition LCD or LED panel configured within a lid portion of the chassis. This display panel may also provide for a touch screen 1025, e.g., adapted externally over the display panel such that via a user's interaction with this touch screen, user inputs can be provided to the system to enable desired operations, e.g., with regard to the display of information, accessing of information and so forth. In one embodiment, display 1024 may be coupled to processor 1010 via a display interconnect that can be implemented as a high performance graphics interconnect. Touch screen 1025 may be coupled to processor 1010 via another interconnect, which in an embodiment can be an I²C interconnect. As further shown in FIG. 10, in addition to touch screen 1025, user input by way of touch can also occur via a touch pad 1030 which may be configured within the chassis and may also be coupled to the same I²C interconnect as touch screen 1025.

For perceptual computing and other purposes, various sensors may be present within the system and can be coupled to processor 1010 in different manners. Certain inertial and environmental sensors may couple to processor 1010 through a sensor hub 1040, e.g., via an I²C interconnect. In the embodiment shown in FIG. 10, these sensors may include an accelerometer 1041, an ambient light sensor (ALS) 1042, a compass 1043 and a gyroscope 1044. Other environmental sensors may include one or more thermal sensors 1046 which may couple to processor 1010 via a system management bus (SMBus) bus, in one embodiment.

Also seen in FIG. 10, various peripheral devices may couple to processor 1010 via a low pin count (LPC) interconnect. In the embodiment shown, various components can be coupled through an embedded controller 1035. Such components can include a keyboard 1036 (e.g., coupled via a PS2 interface), a fan 1037, and a thermal sensor 1039. In some embodiments, touch pad 1030 may also couple to EC 1035 via a PS2 interface. In addition, a security processor such as a trusted platform module (TPM) 1038 in accordance with the Trusted Computing Group (TCG) TPM Specification Version 1.2, dated Oct. 2, 2003, may also couple to processor 1010 via this LPC interconnect.

System 1000 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a near field communication (NFC) unit 1045 which may communicate, in one embodiment with processor 1010 via an SMBus. Note that via this NFC unit 1045, devices in close proximity to each other can communicate. For example, a user can enable system 1000 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 10, additional wireless units can include other short range wireless engines including a WLAN unit 1050 and a Bluetooth unit 1052. Using WLAN unit 1050, Wi-Fi™ communications in accordance with a given Institute of Electrical and Electronics Engineers (IEEE) 802.11 standard can be realized, while via Bluetooth unit 1052, short range communications via a Bluetooth protocol can occur. These units may communicate with processor 1010 via, e.g., a USB link or a universal asynchronous receiver transmitter (UART) link. Or these units may couple to processor 1010 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 1056 which in turn may couple to a subscriber identity module (SIM) 1057. In addition, to enable receipt and use of location information, a GPS module 1055 may also be present. Note that in the embodiment shown in FIG. 10, WWAN unit 1056 and an integrated capture device such as a camera module 1054 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 1060, which may couple to processor 1010 via a high definition audio (HDA) link. Similarly, DSP 1060 may communicate with an integrated coder/decoder (CODEC) and amplifier 1062 that in turn may couple to output speakers 1063 which may be implemented within the chassis. Similarly, amplifier and CODEC 1062 can be coupled to receive audio inputs from a microphone 1065 which in an embodiment can be implemented via dual array microphones to provide for high quality audio inputs to enable voice-activated control of various operations within the system. Note also that audio outputs can be provided from amplifier/CODEC 1062 to a headphone jack 1064. Although shown with these particular components in the embodiment of FIG. 10, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of non-transitory storage medium such as disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first processor core;
   a second processor core;
   a first voltage regulator to provide a first voltage to the first processor core, the first voltage having a first active value when the first processor core is active; and
   a second voltage regulator to provide a second voltage to the second processor core, the second voltage having a second active value when the second processor core is active;
   wherein responsive to a first request to place the first processor core in a first low power state with an associated first low power voltage value that is less than the first active value, the first voltage regulator is to program the first voltage to a first retention voltage value based on first retention voltage information obtained from a storage, wherein the first retention voltage value is less than the first low power voltage value, and first data stored in a first register of the first processor core is to be retained while the first voltage is at the first retention voltage value.

2. The processor of claim 1, wherein in response to programming the first voltage to the first retention voltage value, the second voltage regulator is to provide to the second core when the second core is active, a second core power that includes a second core base power that corresponds to the second active value and a first differential power that corresponds to a difference between the first active value and the first retention voltage value by increase of the second voltage above the second active value.

3. The processor of claim 1, wherein the processor includes a third processor core and a third voltage regulator to provide a third voltage to the third processor core, the third voltage having a third active value when the third processor core is active and wherein when the first voltage regulator is programmed to the first retention voltage value a power differential that corresponds to a voltage difference between the first active value and the first retention voltage value is to be distributed to at least one of the second processor core via the second voltage regulator and the third processor core via the third voltage regulator.

4. The processor of claim 1, wherein responsive to a second request to place the second processor core into a second low power state having an associated second low power voltage value, the second voltage regulator is to reduce program the second voltage to a second retention voltage value based on second retention voltage information obtained from the storage, wherein the second retention voltage value is less than the second low power voltage value.

5. The processor of claim 4, wherein the processor includes additional processor cores, and wherein in response to programming the second voltage at the second retention voltage value, at least a portion of a second differential power associated with a voltage difference between the second active value and the second retention voltage value is to be distributed to the additional processor cores.

6. The processor of claim 5, wherein upon distribution of the second differential power, the processor is to consume approximately a same power as power consumed by the processor while the second voltage is at the second active value.

7. The processor of claim 1, wherein the first voltage regulator is to provide the first voltage selectable from the first active value, the first retention voltage value, and a second retention voltage value, wherein the second retention voltage value is to be selected responsive to a third request to place the first core into a second low power state with an associated second low power voltage value that is distinct from the first active value, wherein the second retention voltage value is lower than the second low power voltage value.

8. The processor of claim 7, wherein the second retention voltage value is to be determined based on second retention voltage information obtained from the storage.

9. A method comprising:
   providing, by a first voltage regulator, a first active voltage to a first processor core of a multi-core processor in a first core active state and providing, by a second voltage regulator, a second active voltage to a second processor core of the multi-core processor in a second core active state; and
   responsive to a first request to place the first processor core into a first core first low power state with an associated first low power voltage lower than the first active voltage, retrieving from a storage first retention voltage information and providing by the first voltage regulator to the first processor core a first retention voltage based on the first retention voltage information, wherein the first retention voltage is lower than the first low power voltage, and retaining data stored in a register of the first core while the first voltage regulator provides the first retention voltage.

10. The method of claim 9, wherein a first power differential corresponds to a difference between the first active voltage and the first retention voltage and the method further comprises responsive to the first request, providing by the second voltage regulator to the second core an enhanced second active voltage that differs from the second active voltage, wherein the first power differential is at least as large as a second power differential that corresponds to a difference between the enhanced second active voltage and the second active voltage.

11. The method of claim 10, wherein the second power differential is approximately equal in magnitude to the first power differential.

12. The method of claim 9, further comprising:
    providing, by a third voltage regulator, a third active voltage to a third processor core of the multi-core processor in a third core active state; and
    upon adjustment of voltage provided by the first voltage regulator from the first active voltage to the first retention voltage responsive to the first request, providing a respective power increase to at least one of the second processor core and the third processor core, wherein a power reduction associated with reduction of the voltage provided by the first voltage regulator to the first core is at least as great as a sum of the respective power increases to the second processor core and the third processor core.

13. The method of claim 12, further comprising responsive to a second request to place the second processor core into a second processor core low power state with an associated second low power voltage, reducing voltage provided to the second processor core to a second retention voltage, wherein the second retention voltage is less than the second low power voltage.

14. The method of claim 13, further comprising distributing a power differential associated with reduction of the voltage provided to the second processor core to at least one other processor core of the multi-core processor.

15. The method of claim 9, further comprising responsive to a third request to place the first processor core into a first core second low power state having an associated second low power voltage distinct from the first low power voltage and lower than the first active voltage, providing by the first voltage regulator to the first processor core a second retention voltage that is lower than the second low power voltage and distinct from the first low power voltage.

16. The method of claim 15, further comprising obtaining second retention voltage information from the storage and determining the second retention voltage based on the second retention voltage information.

17. A system comprising:
a dynamic random access memory (DRAM) to store data; and
a processor to couple to the DRAM, the processor to include a first processor core, a second processor core, a first voltage regulator to provide a first voltage to the first processor core, and a second voltage regulator to provide a second voltage to the second processor core;
wherein responsive to a first request to place the first processor core from a first core active state with a first active voltage into a first low power state with an associated first low power voltage, the first voltage regulator is to obtain from a storage first retention voltage information that corresponds to a first retention voltage that is less than the first low power voltage, and based on the first retention voltage information the first voltage regulator is to program the first voltage to the first retention voltage, and the first core is to retain data in a register of the first processor core while the first voltage is at the first retention voltage.

18. The system of claim 17, wherein in response to a reduction in the first voltage from the first active voltage to the first retention voltage, a power reduction associated with the reduction in the first voltage is to be distributed to at least one other processor core of the processor.

19. The system of claim 17, wherein the processor further comprises a third processor core and a third voltage regulator to provide a third voltage to the third processor core, wherein a power differential associated with reduction in the first voltage from the first active voltage to the first retention voltage is to be distributed to at least one of the second processor core and the third processor core.

20. The system of claim 17, wherein the first voltage regulator is to provide the first voltage selectable from the first active voltage, the first retention voltage, and a second retention voltage, wherein the second retention voltage is to be selected responsive to a second request to place the first core into a second low power state with an associated second low power voltage that is distinct from the first active voltage, wherein the second low power voltage differs from the first low power voltage and the second retention voltage is lower than the second low power voltage, the second retention voltage determined based upon second retention voltage information obtained from the storage.

* * * * *